United States Patent
Greenwood et al.

(10) Patent No.: US 6,764,543 B2
(45) Date of Patent: Jul. 20, 2004

(54) MIXTURE OF SILICA SOLS

(75) Inventors: Peter Greenwood, Göteborg (SE); Hans Bergqvist, Torslanda (SE); Ulf Skarp, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/411,837

(22) Filed: Apr. 11, 2003

(65) Prior Publication Data

US 2003/0200902 A1 Oct. 30, 2003

Related U.S. Application Data

(62) Division of application No. 09/882,108, filed on Jun. 15, 2001, now Pat. No. 6,596,250.
(60) Provisional application No. 60/213,517, filed on Jun. 22, 2000.

(30) Foreign Application Priority Data

Jun. 22, 2000 (EP) .......................................... 00850116

(51) Int. Cl.[7] .............................................. C04B 14/04
(52) U.S. Cl. ..................................................... 106/737
(58) Field of Search ......................................... 106/737

(56) References Cited

U.S. PATENT DOCUMENTS

| | | | | |
|---|---|---|---|---|
| 3,901,987 A | * | 8/1975 | Payne | 428/219 |
| 4,298,392 A | | 11/1981 | Isselmann | 106/98 |
| 4,590,173 A | | 5/1986 | Sasaki et al. | 502/204 |
| 5,932,000 A | | 8/1999 | Bergqvist et al. | 106/737 |
| 6,008,275 A | | 12/1999 | Moreau et al. | 524/5 |

OTHER PUBLICATIONS

Iler, Ralph K., "The Chemistry of Silica," John Wiley & Sons (1979), pp. 406–409.

* cited by examiner

*Primary Examiner*—Paul Marcantoni
(74) *Attorney, Agent, or Firm*—Michelle J. Burke

(57) ABSTRACT

The invention concerns silica sol mixture comprising a first silica sol having a broad particle size distribution, the relative standard deviation being at least about 30% by numbers, and a second silica sol having a narrow particle size distribution having a relative standard deviation lower than about 15% by numbers. The invention also concerns a method for preparing a silica sol mixture and use thereof. The invention further concerns a concrete composition comprising a silica sol mixture and a method for preparing such composition.

18 Claims, No Drawings

MIXTURE OF SILICA SOLS

This application is a division of U.S. application Ser. No. 09/882,108, filed Jun. 15, 2001, now U.S. Pat. 6,596,250 which claims priority of European Patent Application No. 00850116.5, filed Jun. 22, 2000, and U.S. Provisional Patent Application No. 60/213,517, filed Jun. 22, 2000.

The present invention relates to a silica sol mixture and a method for the preparation and use thereof. The invention further relates to a concrete composition comprising said silica sol mixture and a method for preparation and use thereof.

SUMMARY OF THE INVENTION

Silica sols have been known for decades and are nowadays used in a great variety of fields and applications, such as in paper production, coatings, catalysts, ink-jet for paper, in the photo industry, investment casting, refractory fibre bonding, anti-skid products, polishing agents, and as additives in concrete.

In the concrete industry, durable concrete and mortar are being used as building material, in which aggregates or ballast of suitable sizes are bound together by a matrix of a hydraulic binder, usually of cement type, e.g. Ordinary Portland Cement. For simplicity, where otherwise not stated, mortar is here included in the term "concrete".

The durability of concrete is influenced by physical and chemical exposure in the environment. Concrete will thus have a varying durability depending on the environment where it is used. The composition of the concrete will also play an important role how well it resists chemical and physical attacks. Often, several physical and chemical processes will occur simultaneously. One damaging factor often contributes to rendering the concrete more susceptible to attack of another. Corrosion is the most common attack on concrete leading to cracking or spalling thereof. This is due to the corrosion of steel present in concrete constructions. A concrete composition can be protected by providing a stabilizing high pH value, resulting in a protecting oxide film on the steel. If the pH is lowered, the steel will destabilise to such an extent that carbonation and leaching occur. Concrete is used in many applications where it is exposed to chloride ions, e.g. constructions immersed in seawater, concrete in de-icing salted roads, and concrete compositions containing calcium chloride serving as e.g. accelerator. In ground water, concrete is often liable to sulphate ions, which render the concrete weaker in strength. The attack of the sulphate ions lead to expansion of the concrete due to the formation of gypsum, i.e. $CaSO_4$, e.g. in the presence of $MgSO_4$, $Na_2SO_4$ or other sulphate sources, which may result in spalling and disintegration of the concrete. The formation of gypsum occurs as a result of reaction with $Ca(OH)_2$, present in the concrete.

It is thus a big concern to provide concrete compositions with a good resistance, strength and durability, especially in environments exposed to chemical attacks of e.g. sulphate and chloride ions.

There is a further concern to provide concrete compositions having a high early strength. This is especially important in the precast industry, allowing early deforming thereby decreasing the moulding time, when constructing concrete roads making the roads readily open to traffic, and for shotcrete and concrete for industrial flooring as well as other applications where high early strength is required.

Silica sols influence the strength of concrete or mortar by reacting with calcium hydroxide present in the hydraulic binder thereby preventing the formation of large $Ca(OH)_2$ crystals. The adhesion between hydraulic binder and aggregates is also increased. Both of these two properties provide a more homogeneous, denser and stronger mortar or concrete. The presence of silica sols also influence the ion permeability in concrete by forming insoluble calcium silicate compounds rendering the mortar or concrete less permeable and less susceptible to chemical attacks.

U.S. Pat. No. 5,932,000 discloses a concrete composition comprising a concrete mixture and a silica sol containing a broad particle size distribution having a specific surface area of 50–170 $m^2/g$. The concrete mixture is stated to be resistant to chemical attack. However, there is still a need to improve the protection against a combined chemical attack of e.g. chloride and sulphate ions. It is also desirable to further improve the early strength.

The present invention solves the problems above.

DETAILED DESCRIPTION OF THE INVENTION

The present invention relates to a silica sol mixture comprising at least two silica sols. The first silica sol has a broad particle size distribution and a relative standard deviation of the particle size distribution of at least about 30% by numbers, preferably 40%, and most preferably 50%. The second silica sol has a narrow particle size distribution, and a relative standard deviation of the particle size distribution lower than about 15% by numbers, preferably lower than 10% by numbers, and most preferably lower than about 8% by numbers. Ideally, the second silica sol is a substantially monodisperse sol, i.e. a silica sol where all the silica particles have substantially the same size.

The relative standard deviation of the particle size distribution corresponds to the ratio between the standard deviation of the particle size distribution and the average particle size by numbers. "Variation coefficient" and "coefficient of variation" are terms synonymous to "relative standard deviation". The relative standard deviation of the particle size distribution is measured by use of the dynamic light scattering method. By particle size is meant the particle diameter of the silica particles.

The specific surface area of the first broad silica sol suitably is from about 20 to about 300 $m^2/g$, preferably from about 30 to about 200 $m^2/g$, and most preferably from about 50 to about 170 $m^2/g$. The silica particle size distribution of the broad silica sol suitably ranges from about 10 nm to about 100 nm, preferably from about 5 nm to 200 nm.

The silica particles of the second narrow silica sol suitably have a particle diameter ranging from about 2 nm to about 20 nm, preferably from about 3 nm to about 15 nm. The specific surface area of the second narrow silica sol suitably ranges from about 130 to about 1200 $m^2/g$, preferably from about 200 to about 900 $m^2/g$.

The dry weight ratio between the first and second silica sols in the mixture suitably is from about 1:4 to about 20:1, preferably from about 1:1 to about 10:1, and most preferably from about 3:1 to about 7:1. The silica particles are suitably dispersed in water or organic solvents e.g. alcohols, preferably in water. The pH of the aqueous dispersion suitably is from about 1 to about 12, preferably from about 2 to about 11. The silica sol mixture suitably has a silica concentration of from about 1 to about 70% by weight, preferably from about 5 to about 50%. The silica particles are preferably anionic and dispersed in presence of stabilising cations such as $K^+$, $Na^+$, $Li^+$, $NH_4^+$ or the like or mixtures thereof. The silica particles, dispersed in water or solvent, may also occur in aluminate modified form, as described by Dr. Ralph Iler in "The Chemistry of Silica", 1979, pages 407–409.

Suitably, the silica sol mixture contain a mixture of ready available aqueous silica sols mixed together. The silica particles of the silica sol mixture may also be dispersed in other solvents, e.g. organic solvents such as alcohols, or mixtures of solvents.

The present invention also relates to a method for the preparation of a silica sol mixture comprising a first silica sol having a broad particle size distribution and a relative standard deviation of the particle size distribution of at least about 30% by numbers, preferably 40%, and most preferably 50%, and a second silica sol having a narrow particle size distribution and a relative standard deviation of the particle size distribution suitably lower than about 15%, preferably lower than 10%, and most preferably lower than 8% by numbers. The proportions and concentrations of the mixed silica sols are further described above.

The invention further concerns the use of a silica sol mixture as an additive to concrete or mortar.

The invention further relates to a concrete or mortar composition comprising a hydraulic binder, aggregates, water and a silica sol mixture as above described capable of resisting various simultaneous chemical attacks.

It has surprisingly been found that a very good resistance against chemical attack is obtained for concrete or mortar compositions comprising a silica sol mixture as described above having good resistance against ion permeability of several ions simultaneously, e.g. against both chloride ions and sulphate ions.

It has also been found that the presence of the silica sol mixture in a concrete composition imparts a high early strength.

The concrete or mortar composition of the present invention also has the additional advantages of providing concrete having good durability, also against chemical attacks from, for instance, carbon dioxide, nitrogen oxides, and water.

The hydraulic binder may be any cement, e.g. Ordinary Portland Cement (OPC), blast furnace slag cement or other classes of cement comprising slag, fly ash or other cements as described in the literature, e.g. U.S. Pat. No. 6,008,275.

Aggregates are preferably composed of stones, gravel and sand, and commonly having an average particle diameter range from about 0.01 to about 100 mm, preferably from about 0.1 to about 50 mm.

The water:hydraulic binder weight ratio suitably is from about 0.2 to about 1, preferably from about 0.25 to about 0.80.

The concrete composition suitably comprises a concrete mixture of about 100 parts by weight of hydraulic binder, from about 100 to about 1000, preferably from about 200 to about 500 parts by weight of aggregates; from about 0.01 to about 50, preferably from about 0.1 to about 10 parts by dry weight of the silica sol mixture, suitably from about 20 to about 100, preferably from about 25 to about 80 parts by weight of water.

The concrete composition may also comprise various additives, e.g. retarders, superplastisicers, air-entraining agents, accelerators, emulsion latex, hydrophobising agents, shrinkage reducing agents etc. The dosages of these additives are normally in the range of 0.1 to 10% calculated on the dry weight of the hydraulic binder.

The present invention further concerns a method for preparation of a concrete or mortar composition as above described. The concrete composition is prepared by mixing aggregates, hydraulic binder, and the silica sol mixture in any order, before or after addition of water. Suitably, the silica sol mixture, calculated as dry silica, is added in an amount of from about 0.01 to about 50, preferably from about to about 0.1 to 10 parts by dry weight, calculated on the weight of the hydraulic binder. Preferably, the silica sol mixture is added after addition of cement, aggregates, and water. Further properties of the components in the concrete composition are as above described.

The concrete or mortar composition comprising a silica sol mixture can be used as e.g. ready mixed concretes, precast concretes, shotcretes, self-levelling concretes, self-compacting concretes, under water concretes or the like.

Typical applications thereof comprise marine construction concrete, concrete pipes, infrastructure concrete, residential and commercial construction concrete, concrete in tunnel constructions and the like.

The silica sol mixture of the present invention can also be used in various fields and applications. Primarily, the silica sol mixture can be used as a concrete additive, but also as a binder for catalysts, as flocculating agent in ceramic industry, in the production of paper and beverages, as polishing agents for optical lenses and, in the semiconductor industry, as frictioning agent for paper, textiles and floor waxes, antiblock agent for films and coatings, for improving abrasion resistance of films and coatings, as delustering agent for coatings or fibreglass, for improving adhesion of latex adhesives, for improving colour acceptance for printing, in photo paper and textiles, as anti-soil agent for textiles and surfaces, soil sealing, dispersant for pigments and inks, in the photo industry including photo films, light sensitive silver halide emulsions, lithographic printing plate, toner for copying machines and printers etc. The silica sol mixture is capable of improving a variety of properties over standard silica sols, i.e. silica sols containing only one sol. Such improvements include e.g. coating properties, in which the two sols combine the film forming and packing properties of a silica sol with a broad particle size distribution and the high strength increase from a silica sol with a narrow particle size distribution. The silica sol mixture will also be very favourable in e.g. applications using the mechanism of flocculation in paper making, wine clarification, refractory fibre bonding by combining the advantageous properties of the two silica sols. The narrow silica sol imparts a high electrostatic surface charge per kg $SiO_2$, which results in a lower dosage demand, and the broad silica sol yields a more efficient flocculation, based per unit surface area. The broad silica sol also yield denser flocs that settle more rapidly. In wine clarification, it is advantageous to use broad silica sols as the undesired proteins will be liable to coagulation only on the surface of large silica particles, i.e. larger than about 20 nm.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it. If not otherwise stated, all parts and percentages refer to parts and percent by weight.

EXAMPLE 1

Aqueous Na-stabilised anionic silica sols or mixtures thereof (1–6) were prepared as defined below and added to 400 kg Portland cement (ENV 197-1 CEM 1 42.5 R), 1176 kg coarse aggregates of a maximum particle size of 16 mm, 750 kg sand of a diameter size less than 5 mm, 140 kg water, and 8 kg Mighty 150 (a naphthalene sulphonate superplasticiser available from Kao Limited) yielding one cubic metre of concrete. The water:cement weight ratio was 0.35. The measurement of the relative standard deviation of the particle size distribution was performed with a Zetasizer 1000 Instrument available from Malvern Instruments Ltd, by means of Photon Correlation Spectroscopy measuring the dynamic light scattering of the silica particles and applying the "by number" distribution.

1) A broad silica sol A, the average particle size was 17 nm, based on a specific surface area of 170 m$^2$/g, in which the particle size ranged from 5–100 nm. The relative standard deviation of the particle size distribution by numbers was 40%.

2) A broad silica sol B, the average particle diameter of was 35 nm, based on the specific surface area of 80 m$^2$/g, in which the particle diameter ranged from 10–200 nm. The relative standard deviation of the particle size distribution by numbers was 42%.

3) A narrow silica sol A, the average particle size of was 5 nm, based on the specific surface area of 500 m$^2$/g. The relative standard deviation of the particle size distribution by numbers was 7.5%.

4) A narrow silica sol B, the average particle size of was 12 nm, based on the specific surface area of 220 m$^2$/g. The relative standard deviation of the particle size distribution by numbers was 7%.

5) Mixture 1 of silica sols: the silica sol mixture had an average particle size of 18 nm, based on the specific surface area of 150 m$^2$/g, prepared by 5% solids of the narrow silica sol A and of 25% solids of the broad silica sol B.

6) Mixture 2 of silica sols: the silica sol mixture had an average particle size of 26 nm, based on the specific surface area of 103 m$^2$/g, prepared by 5% solids of the narrow silica sol B and 25% solids of broad silica sol B.

The chloride ion resistance was tested for the species appearing in table 1. The test method was performed according to the standard ASTM C1202, which generally consists of monitoring an amount of electric current passed through 51 mm thick slices of 102 mm nominal diameter cores or cylinders during a 6 hour period. A potential difference of 60 V DC is maintained across the ends of the specimen, one of which is immersed in a sodium chloride solution, the other in a sodium hydroxide solution. The total charge passed, in coulombs, is proportional to the resistance of the specimen to chloride ion penetration. The lower the charge passed, the higher the resistance to chloride ion penetration.

TABLE 1

| Product | Silica concentration (per cent by weight) | Silica dosage (dry), (kg/m$^3$ concrete) | Total Charge (Coulomb) |
| --- | --- | --- | --- |
| Broad sol A | 40 | 8 | 3900 |
| Mixture 1 | 30 | 6 | 2800 |
| Mixture 2 | 40 | 8 | 2200 |
| Narrow sol A | 15 | 3 | 4100 |
| Control | — | — | 4100 |

As can be seen in table 1, the presence of the silica sol mixture in the concrete composition reduces the chloride ion permeability more than does the broad silica sol alone or the narrow silica sol alone. Especially the silica sol mixture 2, in which the narrow silica sol has a particle size of 12 nm, corresponding to 220 m$^2$/g, imparts a good resistance against chloride permeability. Also mixture 1, containing a silica sol having a particle size of 5 nm, corresponding to 500 m$^2$/g, shows fairly low chloride permeability.

EXAMPLE 2

Mortar was prepared from Portland cement ASTM Type I, standard sand CEN 196 part 1, water, silica sols, and silica sol mixtures as of example 1. The water:cement weight ratio was 0.48, Mighty 150:cement weight ratio was 0.5%, the cement:sand weight ratio was 0.36. The sulphate resistance was measured according to the standard test method ASTM C1012, in which the change in length of the mortar was measured. This method provides a means for assessing the sulphate resistance of concretes or mortars made using Portland cement, blends of Portland cement with pozzolans or slag cements, and blended hydraulic cements. The sulphate exposure results in a length change of the hydraulic cement exposed.

TABLE 2

| Weeks/ product | Control | Broad silica sol B | Narrow silica sol A | Mixture 1 |
| --- | --- | --- | --- | --- |
| SiO$_2$/m$^3$ mortar | — | 9 kg | 2.7 kg | 5.4 kg |
| 4 | 0.01 | <0.01 | <0.01 | <0.01 |
| 8 | 0.021 | <0.01 | <0.01 | <0.01 |
| 12 | 0.036 | 0.014 | 0.017 | 0.015 |
| 16 | 0.050 | 0.016 | 0.019 | 0.017 |
| 28 | 0.062 | 0.022 | 0.020 | 0.019 |

From table 2, it can be noted that the concrete composition comprising the inventional silica sol mixture shows lower sulphate expansion than does the broad silica sol, although the silica dosage of the sol mixture is 40% lower than the broad silica sol.

EXAMPLE 3

Concrete compositions were as prepared in example 1. High early strength was measured according to the standard test method ASTM C39, consisting of applying a compressive axial load to moulded cylinders or cores at a rate, which is within a prescribed range until failure occurs. The compressive strength of the specimen is calculated by dividing the maximum load attained during the test by the cross-sectional area of the specimen.

TABLE 3

| Product | SiO$_2$ kg/m$^3$ of concrete | Compressive strength, 24 h, MPa |
| --- | --- | --- |
| Control | — | 24 |
| Mixture 1 | 6 | 36 |
| Broad sol A | 8 | 29 |
| Narrow sol A | 3 | 32 |

As can be seen from table 3, there is an increase in compressive strength after 24 hours for a concrete composition comprising a silica sol mixture compared to the concrete composition comprising the sole silica sols.

What is claimed is:

1. A concrete or mortar composition comprising a hydraulic binder, aggregates, a silica sol mixture and water, wherein the silica sol mixture comprises a first silica sol having a broad particle size distribution, the relative standard deviation being at least about 30% by numbers, and a second silica sol having a narrow particle size distribution having a relative standard deviation lower than about 15% by numbers.

2. A composition according to claim 1, wherein the relative standard deviation of the first silica sol is at least about 40%.

3. A composition according to claim 1, wherein the relative standard deviation of the first silica sol is at least about 50%.

4. A composition according to claim 1, wherein the particle diameter of the second silica sol ranges from about 2 to about 20 nm.

5. A composition according to claim 1, wherein the particle diameter of the second silica sol ranges from about 3 to about 15 nm.

6. A composition according to claim 1, wherein the particle diameter of the first silica sol ranges from about 10 to about 100 nm.

7. A composition according to claim 1, wherein the specific surface area of the first silica sol is from about 20 to about 300 $m^2/g$.

8. A composition according to claim 1, wherein the specific surface area of the second silica sol is from about 130 to about 1200 $m^2/g$.

9. A composition according to claim 1, wherein the dry weight ratio between the first and second silica sol is from about 1:4 to about 20:1 based on the silica content.

10. A method for preparing a concrete composition by mixing aggregates, a hydraulic binder, and a silica sol mixture, before or after addition of water, wherein the silica sol mixture comprises a first silica sol having a broad particle size distribution, the relative standard deviation being at least about 30% by numbers, and a second silica sol having a narrow particle size distribution having a relative standard deviation lower than about 15% by numbers.

11. A method according to claim 10, wherein the relative standard deviation of the first silica sol is at least about 40%.

12. A method according to claim 10, wherein the relative standard deviation of the first silica sol is at least about 50%.

13. An additive to concrete or mortar comprising a silica sol mixture wherein the silica sol mixture comprises a first silica sol having a broad particle size distribution, the relative standard deviation being at least 30% by numbers, and a second silica sol having a narrow particle size distribution having a relative standard deviation lower than about 15% by numbers.

14. A method according to claim 10, wherein the particle diameter of the second silica sol ranges from about 3 to about 15 nm.

15. A method according to claim 10, wherein the particle diameter of the first silica sol ranges from about 10 to about 100 nm.

16. A method according to claim 10, wherein the specific surface area of the first silica sol is from about 20 to about 300 $m^2/g$.

17. A method according to claim 10, wherein the specific surface area of the second silica sol is from about 130 to about 1200 $m^2/g$.

18. A method according to claim 10, wherein the dry weight ratio between the first and second silica sol is from about 1:4 to about 20:1 based on the silica content.

* * * * *